(12) United States Patent
Lucas

(10) Patent No.: US 12,384,697 B2
(45) Date of Patent: Aug. 12, 2025

(54) PHOSPHORUS REDUCTION SYSTEM

(71) Applicant: Sustainable Water Infrastructure Group, LLC, Seattle, WA (US)

(72) Inventor: William Lucas, Malvern, PA (US)

(73) Assignee: Sustainable Water Infrastructure Group, LLC, Seattle, WA (US)

( * ) Notice: Subject to any disclaimer, the term of this patent is extended or adjusted under 35 U.S.C. 154(b) by 0 days.

(21) Appl. No.: 17/714,623

(22) Filed: Apr. 6, 2022

(65) Prior Publication Data

US 2022/0315450 A1    Oct. 6, 2022

Related U.S. Application Data

(60) Provisional application No. 63/171,251, filed on Apr. 6, 2021.

(51) Int. Cl.
    *C02F 1/28*    (2023.01)
    *B01J 20/20*   (2006.01)
    *C02F 101/10*  (2006.01)
    *C02F 101/16*  (2006.01)
    *C02F 103/00*  (2006.01)

(52) U.S. Cl.
    CPC .............. *C02F 1/283* (2013.01); *B01J 20/20* (2013.01); *B01J 2220/42* (2013.01); *C02F 2101/105* (2013.01); *C02F 2101/16* (2013.01); *C02F 2103/001* (2013.01)

(58) Field of Classification Search
    None
    See application file for complete search history.

(56) References Cited

U.S. PATENT DOCUMENTS

| | | | | |
|---|---|---|---|---|
| 4,692,248 A * | 9/1987 | Stannard | ............. | B01D 33/807 |
| | | | | 210/403 |
| 5,820,762 A * | 10/1998 | Bamer | ................ | E03F 5/0404 |
| | | | | 210/255 |
| 7,776,217 B2 * | 8/2010 | Lucas | .................... | C02F 3/327 |
| | | | | 210/290 |
| 8,048,303 B2 * | 11/2011 | Lucas | .................... | C02F 1/004 |
| | | | | 210/263 |
| 8,940,958 B2 | 1/2015 | McLaughlin | | |
| 9,873,639 B1 * | 1/2018 | Doccola | .................. | C05G 3/60 |
| 10,800,712 B2 * | 10/2020 | Ciceri | ..................... | C05D 9/02 |

(Continued)

FOREIGN PATENT DOCUMENTS

CN            103877937 A  *  6/2014

OTHER PUBLICATIONS

Streubel, Biochar Produced from Anaerobically Digested Fiber Reduces Phosphorus in Dairy Lagoons, J. Environmental Quality, (Abstract only) (Year: 2012).*

(Continued)

*Primary Examiner* — Chester T Barry
(74) *Attorney, Agent, or Firm* — Dilworth & Barrese, LLP

(57) ABSTRACT

An improved bioretention system and method combines Water Treatment Residuals with biochar, to provide a synergistic phosphorus retention effect beyond what could be achieved with the WTRs or biochar alone. WTRs are commonly used in drinking water treatment plants and can include the material both in its fresh or aged form. Biochar is formed by the pyrolysis of organic material. Water can be directed to flow through a P retention media of WTRs and biochar to synergistically retain the phosphorus from the water beyond WTR or biochar alone.

17 Claims, 2 Drawing Sheets

(56) References Cited

U.S. PATENT DOCUMENTS

| | | | | |
|---|---|---|---|---|
| 11,673,114 | B2* | 6/2023 | Sarkar | B01D 39/06 |
| | | | | 502/401 |
| 12,012,711 | B2* | 6/2024 | Zheng | E02B 3/122 |
| 2003/0155289 | A1* | 8/2003 | Barnhart | B01D 24/042 |
| | | | | 210/237 |
| 2003/0196960 | A1* | 10/2003 | Hughes | B01D 39/2068 |
| | | | | 210/681 |
| 2003/0217974 | A1* | 11/2003 | Uegami | B82Y 30/00 |
| | | | | 210/722 |
| 2005/0199558 | A1* | 9/2005 | Jensen | C02F 1/004 |
| | | | | 210/488 |
| 2005/0221089 | A1* | 10/2005 | Reid | B01J 20/2803 |
| | | | | 428/407 |
| 2012/0219519 | A1* | 8/2012 | McLaughlin | B09B 3/25 |
| | | | | 588/315 |
| 2013/0316898 | A1* | 11/2013 | De Leij | B01J 20/041 |
| | | | | 210/660 |
| 2018/0016162 | A1* | 1/2018 | Wang | C01G 49/08 |
| 2019/0224646 | A1* | 7/2019 | Davis | B01J 20/02 |
| 2022/0153653 | A1* | 5/2022 | Jarand | C05F 11/00 |
| 2023/0264980 | A1* | 8/2023 | Kieser | E03F 1/005 |
| | | | | 210/170.03 |

OTHER PUBLICATIONS

Ngatia, et al., Chapter Biochar Phosphorus Sorption Desorption: Potential Phosphorus Eutrophication Mitigation Strategy, DOI: http://dx.doi.org/10.5772/intechopen.82092 (2019) (Year: 2019).*

Yao, Removal of phosphate from aqueous solution by biochar derived from anaerobically digested sugar beet tailings, J. Hazard Mater., 190(1-3):501-507 (Jun. 15, 2011) (Year: 2011).*

Kasprzyk Waste materials assessment for phosphorus adsorption toward sustainable application in circular economy, Resources, Conservation, & Recycling, 168 (2021), 105335, 9 pp. (Year: 2011).*

Li, Recovery of phosphate from aqueous solution by magnesium oxide decorated magnetic biochar and its potential as phosphate-based fertilizer substitute, Bioresource Technology 215 (2016) 209-214 (Year: 2016).*

Lamont et al., Anaerobically Digested Dairy Fiber: A Renewable Substitute for Peat Greenhouse Product News, Sep. 2015 (Year: 2015).*

L. Zhou, A Screening Approach for the Selection of Drinking Water Treatment Residuals for Their Introduction to Marine Systems, Environmental Toxicology and Chemistry, vol. 40 No. 4, pp. 1194-1203 (2021) published on-line Dec. 3, 2020 (Year: 2021).*

Dietz and Clausen, A Field Evaluation of Rain Garden Flow and Pollutant Treatment, Water, Air, and Soil Pollution (2005), 167:123-138 (Year: 2005).*

Bioretention Media Blends to Improve Stormwater Treatment: Final Phase of Study to Develop New Specifications Final Report, King County, Jan. 2020.

Guidance on Using New High Performance Bioretention Soil Mixes, Washington State Department of Ecology, published Oct. 23, 2021.

* cited by examiner

PHOSPHORUS REDUCTION SYSTEM

This application claims priority to and the benefit of U.S. Provisional Application Ser. No. 63/171,251, filed on Apr. 6, 2021, the entire contents of which are incorporated herein by reference.

BACKGROUND OF THE INVENTION

The invention is directed to a bioretention system and method for removing phosphorus (P) and other contaminants from fluid effluent, such as wastewater and stormwater runoff.

More specifically, the invention relates to a system and method for removing excess phosphorous (P) and/or nitrogen (N), such as dissolved P and N in the form of P or N compounds and ions, from stormwater and other polluted wastewater effluent. The invention also relates to improved media for long-term phosphorus retention in bioretention systems and an improved outlet for promoting nitrogen retention.

Bioretention systems often include a basin to contain the effluent to be treated. The bottom of the basin is commonly composed of a porous media that is planted with vegetation. As the effluent passes through the bioretention system, particulate pollutants are removed by filtration. Dissolved phosphorus can be removed from the effluent by biological processes of the system such as vegetative and microbial biomass uptake, as well as chemical adsorption/precipitation processes (herein referred to under the category of sorption), which are effected by properties of the media. Dissolved nitrogen can also be removed from the effluent by vegetative and microbial biomass uptake, as well as biological transformations, including denitrification, that eventually convert nitrogen into nitrogen gas.

Bioretention systems have been documented as being cost-effective effluent management facilities for stormwater runoff in terms of removing sediments and sediment bound phosphorus and nitrogen. This can be particularly relevant in watersheds that have been impacted by urban and/or agricultural runoff to such an extent that they are the subject of what are referred to as Total Maximum Daily Load (TMDL) criteria for nutrients. However, typical bioretention systems with sandy media and free discharge outlets are less effective for dissolved nitrogen and long term dissolved phosphorus removal. Methods to increase retention of nutrient pollutants to meet TMDL criteria can be important in the design of effluent management facilities, so they can more effectively process effluent in a more acceptable and efficient manner.

Accordingly, there is a need for improved bioretention systems and methods and for improved media to be used in bioretention systems

SUMMARY OF THE INVENTION

Generally speaking, in accordance with the invention, an improved bioretention system and method combines Water Treatment Residuals (WTRs) with biochar, to provide a synergistic retention effect beyond what could be achieved with the WTRs or biochar alone.

WTRs are commonly used in drinking water treatment plants and can include the material both in its fresh or aged form. The aged form is preferred for many applications. WTRs can include the residues resulting from coagulating dissolved organic acids and mineral colloids with either aluminum or iron sulfate. Comprising clay, organic matter and the original metals, these materials are typically very fine textured and can be very resistant to air drying when fresh. Once dry, they form brittle cohesive hydrophobic aggregates. After a period of exposure to weathering, the WTRs become less brittle and hydrophobic and easier to blend.

The use of Water Treatment Residuals (WTRs), and a media for absorbing phosphorus is described in U.S. Pat. No. 7,776,217, the contents of which are incorporated herein by reference. While WTRs can be highly effective for phosphorus removal, it has been determined that blending WTRs with biochar, as described below, can lead to a synergistic improvement in phosphorus removal treatments. It is conventionally believed that biochar is essentially ineffective in the removal of P from effluent streams and standing pools. However, it has been found that careful mixing of properly prepared biochar with carefully selected WTRs can lead to an extremely effective system of phosphorus treatment.

The P retention media can comprise WTR, biochar and inert material such as sand and/or other aggregates. The media can be stored in a container, which can have an inlet and outlet. The media can be loaded into a depression in the ground, with the water directed to flow therethrough.

Other advantages and objects of the invention will be apparent from the drawings and descriptions to follow.

BRIEF DESCRIPTION OF THE DRAWINGS

The following drawings are presented for illustration only, and should not be considered to limit the scope of the invention.

DETAILED DESCRIPTION OF THE PREFERRED EMBODIMENTS

Figure 1:
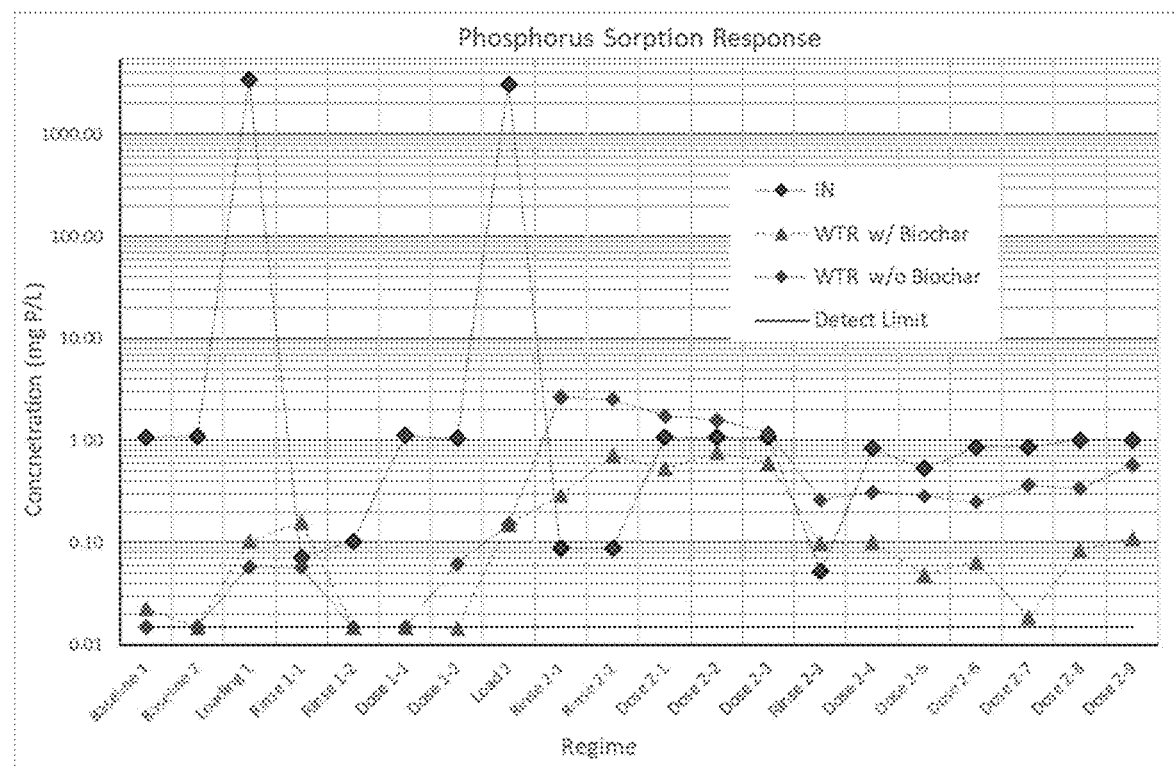
FIG. 1 is a graph illustrating the sorption of phosphorus by water treatment residuals, both with and without the addition of biochar in accordance with a preferred embodiment of the invention.

The present disclosure may be understood more readily by reference to the following detailed description of the disclosure, taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Composition

Biochar comprises the organic carbon and ash residue remaining after pyrolysis, the process of heating organic material at high temperatures without or with sufficiently reduced oxygen. The effective lack of oxygen prevents the carbon in the source material from being burned, even when heated up to about 1100° F., 1200° F., or higher. Instead, the organic material is converted into a charcoal-like substance. Hardwood-derived biochar is commonly used on charcoal cooking grills.

The temperature sequence and duration of pyrolysis can affect the physical characteristics of the resulting biochar, such as its porosity and specific surface area (SSA). Higher temperatures and longer durations of pyrolysis lead to increased porosity and SSA. Higher SSA provides higher contact area and increased porosity increases retention time for reactions to occur when different materials come into intimate contact with the biochar. This means that higher pyrolysis temperatures should be favored when forming biochar for phosphorus (P) retention, from a contact time standpoint.

It has been determined that the source material for the biochar can have a major impact on the P sorbing properties of a particular biochar. These components can include anionic constituents such as calcium, magnesium, iron, aluminum and other elements. These positively charged anions all tend to have a high affinity for negatively charged P, in distinct contrast to the negatively charged carbon matrix that comprises the majority of the biochar mass.

It has also been determined that the high temperatures that produce more porosity and SSA drive off many of these elements. As a result, a balance should be made between positive physical properties from high pyrolysis temperatures and longer durations as opposed to the resultant losses on geochemical potential P sorption capacity. The precise combination of temperature and duration for each potential source depends on the nature of the source and should be analyzed and monitored to find the optimal formation process for each individual material source. Such testing and analysis are well within the skill in the art.

Types of Biochar

Biochar can be made from almost any biological source, whether plant or animal based. In addition to hardwood or softwood trees, biochar can be derived from beet or sugar bagasse (the fibers left from beet or sugar pressings), peanut shells, corn cobs, wheat straw, bamboo, shrimp carapaces, egg shells, chicken manure, biosolids, as well as many more sources. It has been determined that the biochars derived from the animal sources have a relatively higher P sorption capacity, compared to the biochars derived from plant sources, which tend to have a lower P sorption capacity.

Performance of Different Types of Biochar

It should be noted that bagasse and wood-derived biochars are currently the only sources available in large quantities suitable for stormwater and wastewater treatment.

P adsorption by biochar has been found to be inadequate for P removal and less effective than WTRs. It can be quantified by the equilibrium concentration compared to the amount of P adsorbed. The lower value at a given quantity adsorbed indicates the more effective biochar. This is expressed in terms of mg/L discharged at accumulated mass in terms of g/kg.

Adsorption studies comprise several types. The most common are the Batch Studies, where a small quantity of biochar is immersed into a much larger quantity of water at different P concentrations for long durations (up to a week). The biochar absorbs some of the P, resulting in a lower concentration with the removed P being expressed in g/kg. Since these conditions are very unlike filtration systems, the preferred approach is using laboratory columns or field mesocosms (small-scale ecosystems). Pot and soil studies are similar.

Most of the biochars studied had either little-to-no effect or negative effects on P removal without the presence of WTRs. Where there was P removal, the discharge concentrations were much higher than suitable for environmental discharges, which should be no higher than 0.10 mg/L, and preferably lower.

The evaluation of the P sorption herein focuses on equilibrium concentrations in the range of about 0.1 mg/L at 5 to 10 g/kg, a small fraction of the 1-100 mg/l equilibrium concentrations reported in past studies. Therefore, even though some studies have shown that biochars can have a minor effect on P sorption at these concentrations, such low discharge concentrations are limited to very low mass accumulated.

Performance of Biochars with WTRs

The use of Water Treatment Residuals (WTRs) as a P adsorbent with very high capacity for retaining P while discharging at very low concentrations is described in U.S. Pat. Nos. 7,776,217 and 8,048,303, incorporated herein by reference. Properly selected and prepared, WTR-amended media can discharge at 0.02-0.04 mg/L at 1-2 g/kg WTR retained. Being a fraction of the concentration of P discharged from even the most effective biochar studies, this illustrates how the biochar contribution to P removal, even at its best, is still far below that which current WTRs can adsorb.

However, it has been determined that when combined properly, biochar can significantly promote P retention by WTRs and exhibit a synergistic, enhanced effect, beyond what could be predicted from the additive weights or P removal capacity of the separate materials. Using the same WTR with and without biochar, a series of column experiments were performed, where dosing runs are used to establish a baseline P removal response. The columns were then loaded with water having extremely high P concentrations, in excess of 3,100 mg/L P, to accelerate P accumulation by the media. This is termed as a loading cycle. The resultant discharge concentration was remarkably low, representing a 99.99% P retention.

This finding is based on using a softwood biochar mixed at a percentage by weight varying from 5% to 25%. But would be achieved with other types of biochar. This was added to an aluminum-based WTRs which were mixed at percentage by weight varying from 5% to 40%. A preferred range of biochar is about 10-20%. The media should have about 10-35%, preferably 15-30% WTRs. The remaining inert matrix can be any type of media, such as sand, preferably with a medium to coarse sand particle size, or more preferably, a lightweight expanded clay or shale aggregate crushed to a medium to coarse sand particle size.

The loading cycle was then followed by a rinsing regime, using tap water, to rinse out excess P left over from the extreme load. Rinsing outflows are typically higher than inflows. A second series of dosing runs was then performed, to document the increase in outflow concentration due to the accumulated mass. A second loading cycle then further accelerated WTR P accumulation. This is followed by a second rinsing regime. Finally, a series of dosing runs is used to determine the discharge concentration after accumulating the increased mass. This trend is illustrated in FIG. 1. The results are tabulated in Table 1.

FIG. 1 presents an experimental record comparing WTR with Biochar, to WTR without Biochar mixtures. As can be seen in FIG. 1, the WTR with biochar mixture unpredictably performed significantly better than the WTR without biochar mixture, for every observation above the detection limit, except Load 1 and Rinse 1 runs. (Biochar without WTR has little to no P retention) As more tests were run, the difference between the two media become more pronounced. Table 1 (below) quantifies the resultant changes in discharge concentrations, percent removal and biochar reduction for the mass accumulated after each load.

TABLE 1

Inflow and Outflow Concentrations, Percent Removal, and WTR With Biochar Reduction P

| Dose Inflow (P mg/L) | WTR w/ Biochar (P mg/L) | WTR w/o Biochar (P mg/L) | Biochar P Reduction |
|---|---|---|---|
| After Load 1 (3.84 g/kg) | | | |
| 1.075 Dose Removal | 0.015 98.6% | 0.039 96.4% | 61.6% |
| After Load 2 (7.32 g/kg) | | | |
| 0.855 Dose Removal | 0.065 92.4% | 0.361 57.7% | 81.9% |

As shown in Table 1, the WTR media without the biochar had much less P sorption capacity than the WTR with biochar, especially after the second load. While the difference was not as pronounced in after the first load, the 455% increase in discharge concentration after the second load is significant with respect to the use of WTR without biochar where highly sensitive waters require very low P discharges, such as the Everglades that require discharges below the P detection limit of 0.010 mg/L. This ability to discharge at very low P concentrations is an important finding of this study. Only WTRs combined with biochar were able to discharge at such low P concentrations after accumulating high P loads.

Figure 2:
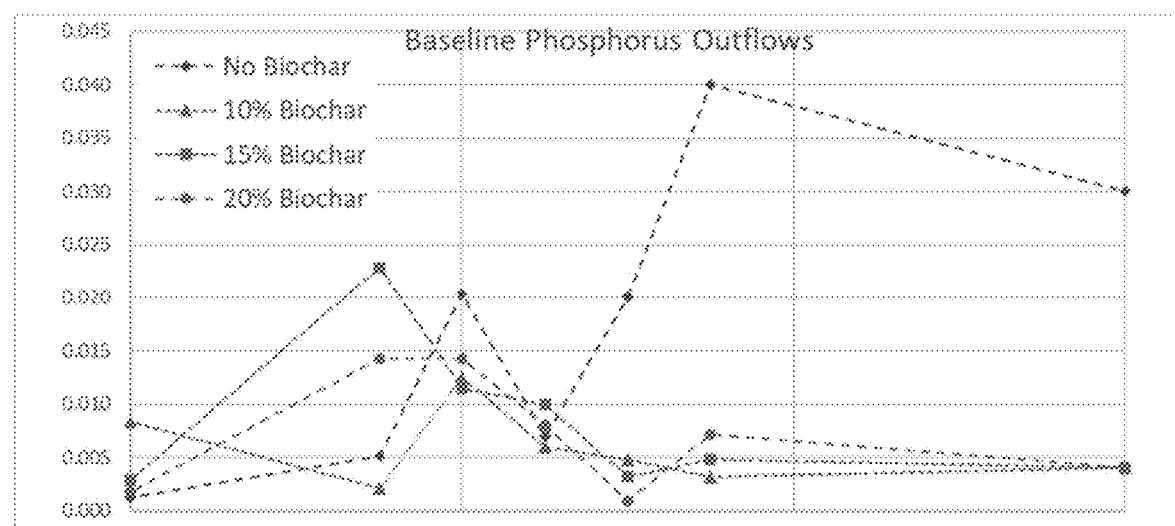
FIG. 2 is a graph illustrating the sorption of phosphorus by water treatment residuals, with differing ratios of biochar, in accordance with preferred embodiments of the invention

FIG. 2 presents the results of a subsequent testing of the same source of WTRs blended with biochar at different ratios of 10% biochar, 15% biochar and 20% biochar as compared to no biochar, over a two week time period. The WTRs were held constant at 30% of the total media in all samples. In this case, once the systems all stabilized after several weeks of dosing, the biochar amended media discharged at concentrations roughly half that of the WTR media with no biochar. Table 2 summarizes the results of this testing.

TABLE 2

Inflow and Outflow Concentrations, and Increases in P Reduction Due to Biochar

| Dose Inflow (P mg/L) | WTR w/No Biochar (P mg/L) | WTR with 10% Biochar (P mg/L) | WTR with 15% Biochar (P mg/L) | WTR with 20% Biochar (P mg/L) |
|---|---|---|---|---|
| 1.666 Biochar P Reduction | 0.016 — | 0.006 62.5% | 0.009 43.8% | .007 56.3% |

FIG. 2 presents the trend in concentrations over the testing period summarized in Table 2. Here it can be seen that the no biochar media actually discharged at several times that of the biochar-amended media in the later runs after the WTR only media had become fully stabilized. This further reinforces the trends illustrated in FIG. 1

Moreover, it is the ultimate long term performance of the WTR with biochar combination that also excels and perhaps, matters even more. This determines the ultimate capacity of the treatment system. At higher mass adsorbed, the WTR with biochar discharged at P concentrations 82% lower than without biochar. The P concentration of 0.065 mg/L is considered suitable for nearly all non-critical watersheds, while the discharge of 0.361 mg/L would not be acceptable. This much better performance at high mass loads accumulated means that a treatment system using WTRs with biochar will have a much longer useful life for a given discharge criterion.

These results were verified in a subsequent experiment after applying a load of 8.75 g/kg, another WTR media amended with 10% biochar leached P at 1.68 mg/L, over twice the 0.75 mg/L of the same WTRs amended with 20% biochar. These observations again illustrate how Biochar synergistically improves long term P retention by the media.

WTRs with biochar unexpectedly discharged at much lower concentrations for a given inflow at a given mass accumulated than WTRs without biochar. Preferred P reduction media is formed with a ratio of biochar:WTR of at least 1:5, preferably 1:2 and more preferably, even greater. With WTRs comprising at least 20%, preferably 30% of the media, inert material, such as sand or lightweight aggregates can be added to comprise up to 60% of the media for P reduction, preferably up to 55%, more preferably up to 50%. In many installations, the amount of inert material could be more or less. The addition of biochar to WTRs can enhance P removal of WTRs by at least 50% and often much higher, compared to WTRs alone.

As a nonlimiting example, the WTR that had accumulated 7.3 g/kg of phosphorus was subjected to an inflow P concentration of 1.0 mg/L and exhibited a P discharge at over 0.3 mg/L without biochar. This less than 70% P removal demonstrates the effective removal of P by WTRs alone. However, with the addition of biochar at 15% by weight and a biochar to WTR ratio of about 1:2, the same weight amount of WTRs discharged only 0.065 mg/L of P, 82% lower than the WTR alone, at a removal over 92%. Note that biochar alone has essentially no P removal at these loads. With this amount of WTR, the discharge concentration without biochar would not be acceptable under most standards for discharge into receiving waters, while the lower discharge with biochars is protective of receiving waters and meets most standards.

WTRs with biochar can accumulate much more P while still discharging at a much lower concentration than WTRs without biochar.

By way of another nonlimiting example, WTRs that had accumulated 3.8 g/kg of phosphorus were subjected to an inflow P concentration of 1.0 mg/L and exhibited a P discharge at 0.049 mg/L without biochar. With biochar present at 15% by volume and a biochar to WTR ratio of about 1:2, the same WTRs discharged P at only 0.019 mg/L to the same inflow concentration of 1.0 mg/L. The 0.049 mg/L discharged from the WTR without biochar was only 25% less than the 0.65 mg/L discharged by the WTR with biochar after almost twice as much P had been accumulated.

Note that where this application has listed the steps of a method or procedure in a specific order, it may be possible, or even expedient in certain circumstances, to change the order in which some steps are performed, and it is intended that the particular steps of the method or procedure claim set forth below not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A particulate phosphorus retention media for the removal of phosphorus from phosphorus-containing water at a first phosphorus concentration flowing through the media, wherein a portion of the phosphorus of the phosphorus-containing water is sorbed by the media, comprising a phosphorus retention component consisting of inert material, a plurality of water treatment residual (WTR) particles, and biochar particles consisting of biochar, the biochar particles comprising about 10-20% by volume of the phosphorus retention component, and wherein the amount of biochar present in the media is effective to enhance sorption of phosphorus from the phosphorus-containing water by the phosphorus retention component beyond the additive sorptions of the WTR particles and the biochar particles individually.

2. The media of claim 1, wherein the biochar particles have about the same particle size distribution as the WTR particles.

3. The media of claim 1, wherein the biochar particles are formed from an animal source.

4. The media of claim 1, wherein the biochar particles are formed from a plant source.

5. The media of claim 1, wherein the biochar particles are formed from a softwood source.

6. The media of claim 1, wherein the biochar particles are included as at least 5% by weight of the biochar and WTR combination.

7. The media of claim 1, wherein the biochar particle to WTR particle ratio is at least 1:5.

8. The media of claim 1, wherein the biochar particle to WTR particle ratio is at least 1:2.

9. The media of claim 1, wherein the media comprises at least about 20% WTR particles.

10. The media of claim 1, wherein the media comprises at least about 30% WTR particles.

11. The media of claim 1, wherein the inert material comprises sand, clay, crushed shale, or combinations thereof.

12. A system for reducing P content of stormwater runoff containing a first concentration of phosphorus, comprising a media storage area having an inlet adapted and positioned to receive stormwater runoff, the media storage area containing a phosphorus reduction media comprising 10-20% by volume biochar particles consisting of biochar combined with a plurality of WTR particles, the phosphorus reduction media positioned to receive the stormwater runoff from the inlet, and an outlet adapted to discharge the stormwater, after the stormwater has passed through the media.

13. A method of removing phosphorus from stormwater runoff, comprising passing the stormwater through a media comprising WTR particles and 10-20% by volume biochar particles consisting of biochar, wherein the amount of biochar present is effective to enhance sorption of phosphorus from the stormwater beyond the additive sorptions of the WTR particles and the biochar particles individually.

14. The method of claim 13, wherein the amount of biochar present is effective to enhance sorption of phosphorus from the stormwater beyond the additive sorptions of the WTR particles and the biochar particles individually by at least 50%.

15. A particulate media, comprising a P retention component consisting of a plurality of water treatment residual (WTR) particles, inert material, and about 10-20% by volume biochar particles consisting of biochar, wherein the amount of biochar particles present is effective to enhance sorption of phosphorus from phosphorus-containing water by the P retention component beyond the additive sorptions of the WTR particles and the biochar particles individually.

16. A particulate media for the removal of phosphorus from phosphorus-containing water at a given phosphorus concentration flowing through the media, wherein a portion of the phosphorus of the phosphorus-containing water is sorbed by the particulate media, the media consisting of inert material and a plurality of particles consisting of water treatment residual (WTR) particles mixed with biochar particles consisting of biochar, wherein the proportion of biochar particles in the media is effective to enhance P sorption at least 50% beyond the additive sorptions of the WTR particles and the biochar particles individually, and wherein the biochar particles alone are substantially ineffective at adsorbing phosphorus from phosphorus-containing water at said concentration.

17. A particulate media consisting of a plurality of water treatment residual (WTR) particles, inert material, and about 10-20% by volume biochar particles, wherein the amount of biochar present is effective to enhance sorption of phosphorus from phosphorus-containing water by the media beyond the additive sorptions of the WTR particles and the biochar particles individually.

\* \* \* \* \*